United States Patent
Montsinger et al.

(10) Patent No.: US 9,365,003 B1
(45) Date of Patent: Jun. 14, 2016

(54) EXTRUSION LAMINATION WITH REGISTERED COLD SEAL ADHESIVE

(71) Applicants: Mark Stephen Montsinger, Germantown, TN (US); John Andrew Pratt, Pleasant Plains, AR (US); Bryan Joseph Thibeault, Southaven, MS (US)

(72) Inventors: Mark Stephen Montsinger, Germantown, TN (US); John Andrew Pratt, Pleasant Plains, AR (US); Bryan Joseph Thibeault, Southaven, MS (US)

(73) Assignee: BRYCE CORPORATION, Memphis, TN (US)

( * ) Notice: Subject to any disclaimer, the term of this patent is extended or adjusted under 35 U.S.C. 154(b) by 106 days.

(21) Appl. No.: 14/214,538

(22) Filed: Mar. 14, 2014

Related U.S. Application Data (60) Provisional application No. 61/800,467, filed on Mar. 15, 2013.

(51) Int. Cl.
*B29D 22/00* (2006.01)
*B65D 85/60* (2006.01)

(52) U.S. Cl.
CPC .............. *B29D 22/003* (2013.01); *B65D 85/60* (2013.01)

(58) Field of Classification Search
CPC .... B29D 22/003; B65D 85/60; A23G 7/0012; B65B 5/062; B65B 5/12; B65B 25/005; B65B 51/02; B29C 65/4825
USPC ......... 156/64, 244.16, 244.18, 267, 351, 378, 156/379; 493/10, 13, 22, 128
See application file for complete search history.

(56) References Cited

U.S. PATENT DOCUMENTS

| | | | |
|---|---|---|---|
| 3,865,664 A * | 2/1975 | Neumann | B65D 75/26 156/192 |
| 4,673,601 A | 6/1987 | Lamping et al. | |
| 5,874,155 A | 2/1999 | Gehrke et al. | |
| 6,074,731 A | 6/2000 | Wilkie | |
| 6,086,694 A * | 7/2000 | Winter | G09F 5/04 118/669 |
| 7,235,294 B2 | 6/2007 | Story | |
| 7,695,809 B1 | 4/2010 | Maksymkiw et al. | |
| 7,799,436 B2 | 9/2010 | Wieners et al. | |
| 8,262,830 B2 | 9/2012 | Hebert et al. | |
| 8,262,832 B2 | 9/2012 | Hebert et al. | |
| 2008/0173385 A1 * | 7/2008 | Ansinn | B29C 66/91218 156/64 |
| 2009/0197022 A1 | 8/2009 | Lu et al. | |
| 2010/0189938 A1 | 7/2010 | Hewitt et al. | |
| 2012/0156415 A1 | 6/2012 | Willey et al. | |
| 2013/0056469 A1 | 3/2013 | Davis et al. | |

* cited by examiner

*Primary Examiner* — George Koch
(74) *Attorney, Agent, or Firm* — Joan L. Simunic

(57) ABSTRACT

The present invention is a method for forming a laminate for use as a flexible packaging wrapper for confections and other food bars. An outer clear film usually oriented polyolefin is printed, preferably reverse printed, with graphics. In a tandem extrusion lamination with registered cold seal process a molten, polyolefin extrudate is applied to bond the outer printed film to an inner film. The inner film is preferably oriented polyolefin and may have a metallized coating of aluminum buried against the extrudate. Finally, a pattern of cold seal adhesive is applied to the inner film surface. The flexible package made with the extrusion lamination process offers improved stiffness, puncture resistance, abrasion resistance and durability over a similar structure produced with adhesive lamination.

12 Claims, 9 Drawing Sheets

EXTRUSION LAMINATION WITH REGISTERED COLD SEAL ADHESIVE

CROSS-REFERENCE TO PRIOR APPLICATIONS

The present application claims priority to U.S. Patent Application 61/800,467 filed 15 Mar. 2013, which is incorporated by reference in its entirety.

FIELD OF THE INVENTION

The invention relates to flexible packaging for confections, and in particular, to packaging for use with temperature sensitive confections, such as chocolate candy bars and caramel bars, or cereal, nutritional and protein bars, and more particularly to the method of manufacturing such packaging.

BACKGROUND OF THE INVENTION

In the food packaging industry heat sealable multi-ply films are commonly used as wrappers for foodstuffs. Confections such as chocolate candy bars are sensitive to high temperatures, and are ordinarily packaged in wrappers that employ "cold seal" adhesive sealable materials. The cold seal package sealing operation may be accomplished with sealing jaw pressure and without excessively high temperatures which can damage the foodstuff, e.g. melt the chocolate or caramel. Moreover, since these methods do not require heating the wrapper film, they can operate at higher speeds than traditional, heat seal packaging lines.

Polymeric films are generally used to create the flexible wrapper for the bar-shaped food. These films are typically biaxially oriented polypropylene films, but may be polyester, nylon, cellophane and/or polylactic acid films. Polymeric films produced with a cast or blown process can be used, but their lower machine direction tensile strength and excessive extensibility under tension or under thermal exposure may prevent adequate lamination. These biaxially-oriented polymeric films are typically used as the outer film and the inner film in a composite laminated structure.

The outer film is usually the printed web. The outer film can be surface printed with inks and a cold seal release coating or overlacquer that is on top of the inks. The outer film can also be printed on the inner surface with inks in a reverse image visible as a positive image from the outside of the clear film. The surface energy of the printable surface is typically 38 to 45 dyne/cm as measured with special dyne solutions per ASTM 2578 for sufficient wetting of the ink on the film surface. The film surface energy is dependent upon the polymer properties and also controlled with corona treatment or flame treatment. The other surface of the outer film typically has a cold seal adhesive release surface. The cold seal release surface can be a coating or an outer skin layer of a multilayer film produced with coextrusion when manufacturing the film.

The inner film has an exterior surface receptive to bonding to the cold seal adhesive. The inner film may also have a metallized coating on the opposing surface. The metallized coating layer is typically aluminum or an aluminum oxide and provides a moisture and oxygen barrier to the laminated structure. The inner film cold seal adhesive receptive surface is the surface in contact with the foodstuff or bar.

Chocolate candy bars have existed for decades with various wrappers. Most of the wrappers are a lamination of two films: an outer film laminated to an inner film to imbed the inks and thereby prevent surface abrasion. The outer film typically has a cold seal release layer on one surface and reverse printing on the other surface. The lamination method is normally adhesive lamination, a technique well known in the industry. The cold seal adhesive is applied to the inner film of the laminate of the two films via a gravure cylinder and in registration with the printed graphics or images on the outer film. The cold seal adhesive is applied in a frame pattern matching each printed impression, but on the opposite side. The registration of the cold seal lay down must align within the printed impression image on the opposite side of the web. This can be triggered by reading an eyemark printed with the graphics and on every impression. The printed impressions are typically running in both the machine direction and transverse direction of the printed web. The width of one printed impression and the width of the printed film determines how many impressions are made across the printed web width. The impression cut-off or repeat will determine the number of impressions running in the machine direction per length. This cut-off also determines the number and size of cold seal adhesive patterns etched on the circumference of the gravure cylinder.

Adhesive lamination via solvent based adhesive coating or aqueous based adhesive coating relies on controlled web tensions and oven drying. These various adhesive laminations put very little stress on the films via tensions and the oven temperatures are such that the shrinkage or expansion on the films is minimal allowing easy registration of the cold seal adhesive. The adhesive laminate is generally fed into a nip section with a pressure roller, typically made of rubber or neoprene with Rockwell hardness of 70, and an etched gravure cylinder applying the adhesive. The gravure cylinder is set to a speed in rpms to match the desired laminate web speed. To maintain cold seal adhesive registration, the laminate web speed is adjusted with extruder output, web speed and web tension.

In extrusion lamination the web is often printed to be purposely undersized by 1 mm to 3 mm depending on the film to be printed. Polyester (PET) film would have minimal undersizing whereas an oriented polypropylene (OPP) film would have greater undersizing. This is determined by the properties of the films. PET film is less extensible under thermal and mechanical stress than OPP film. Under heat exposure from the extrusion lamination in combination with web tension the laminate is purposely stretched by a few mm into registration with the cold seal adhesive cylinder running at a set speed.

The incorporation of cold seal adhesive material into a multi-ply wrapper structure has typically required the use of complex and expensive manufacturing techniques where all the plies are joined together and the cold seal adhesive is applied in register in a single process step. Known wrapper constructions employing cold seals also require relatively expensive component layers, films, and the like in order to provide the necessary sealing functions, aesthetics, and to accommodate manufacturing needs. Thus, there is a need for an improved foodstuff wrapper construction and related method of manufacture for use with heat sensitive foodstuffs such as chocolate, nutritional bars, grain and cereal bars, and other confections, and which are suitable for use in higher speed wrapping operations. Specifically, it would be advantageous to have an extrusion lamination process in tandem with the application of cold seal adhesive. Because the application of cold seal adhesive requires precise registration and extrusion lamination involves film stretching due to the molten extrudate temperature and web tension, to combine both processes in a single tandem process is challenging. Tandem process meaning the combination of two processes in a single pass. The two processes are (1) extrusion lamination of an outer film and inner film, and (2) the process of applying a cold seal adhesive to the inner film in registration to the outer film with printed graphics.

SUMMARY OF THE PRESENT INVENTION

The present development is a method for forming a laminate for use as a flexible packaging wrapper for confections and other food bars, wherein the packaging wrapper is formed by an extrusion lamination process in tandem with the application of cold seal adhesive. An outer clear film is printed with graphics. In the tandem extrusion lamination with registered cold seal process a molten, polyolefin extrudate is applied to bond the outer printed film to an inner film. A pattern of cold seal adhesive is then applied to the inner film surface, and dried. The laminate with cold seal adhesive is wound onto a core for transport to an end-product packaging line. The flexible package made with the extrusion lamination process offers improved stiffness, puncture resistance and durability handling over a similar structure produced with adhesive lamination.

In a preferred embodiment, the outer clear film is an oriented polyolefin, preferably reverse printed. A polyolefin extrudate is applied to bond the outer printed film to an inner film. The inner film is preferably an oriented polyolefin, and may optionally have a metallized coating of aluminum buried against the extrudate.

DETAILED DESCRIPTION OF THE PRESENT DEVELOPMENT

Figure 1:
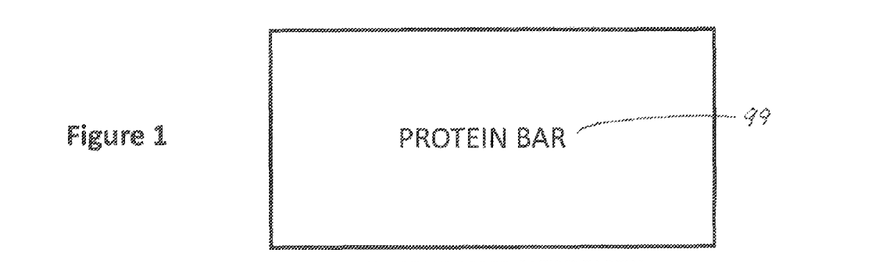
FIG. 1 is a front view of a wrapped product using a wrapper produced according to the process of the present development.
Figure 2:
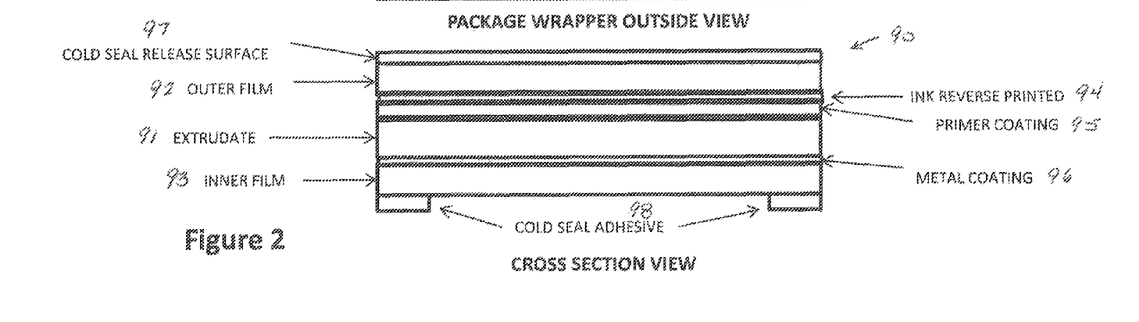
FIG. 2 is an exaggerated view depicting the layered structure of the flexible packaging produced according to the process of the present development.
Figure 3:
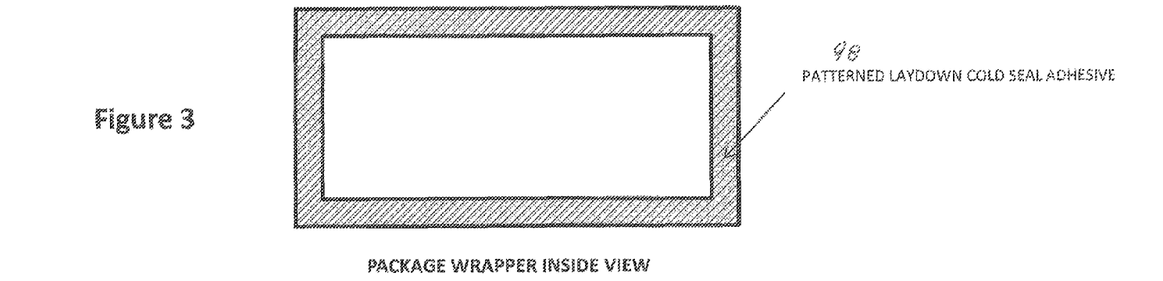
FIG. 3 is a view of the inner film with cold seal adhesive applied.

The present development is a method for forming a laminate for use as a flexible packaging wrapper for confections and other food bars. As shown in FIGS. 1-3, the laminate 90 comprises a plurality of film 91, 92, 93, coating 94, 95, 96 and adhesive layers 97, 98, with graphics 99 visible on at least one face of the laminate. On the opposing face, cold seal adhesive 98 is applied in a pattern that allows for the laminate to be wrapped around a product, such as a candy bar, and then the laminate is oriented so that predetermined cold seal adhesive strips can be abutted and pressed together to form a closed and well-sealed package.

As shown in FIGS. 4-11, the tandem extrusion lamination with registered cold seal process involves several sequential steps or sections. The tandem process requires unique controls of the web and drive systems to maintain acceptable registration.

Figure 4:
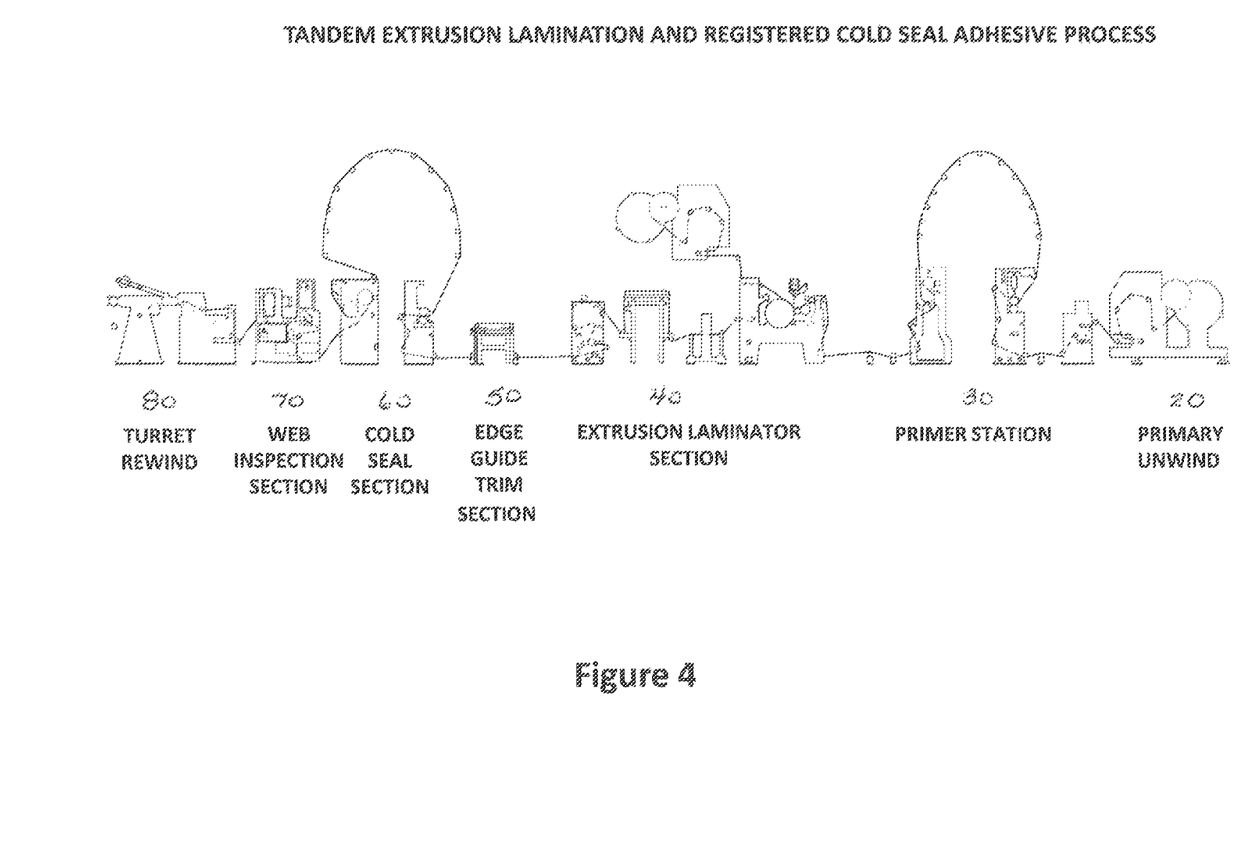
FIG. 4 is a schematic view of the tandem extrusion lamination and registered cold seal adhesive process of the present development.
Figure 5:
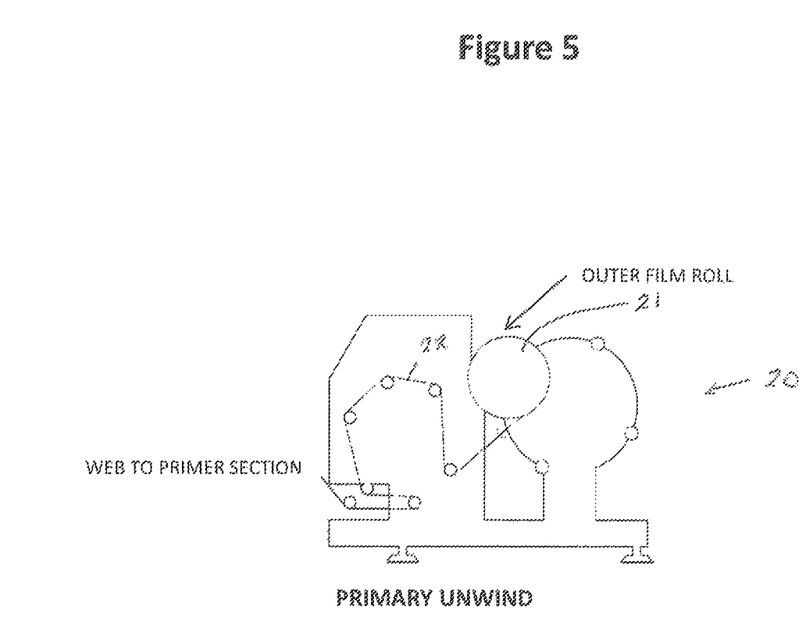
FIG. 5 is an expanded view of the primary unwind of the tandem process shown in FIG. 4.

FIGS. 4 and 5 refer to the primary unwind stage. First, a roll 21 of outer clear film is provided, and loaded onto a primary unwind 20. Although not required, the outer clear film may optionally be printed with graphics on at least one face. The outer clear film 22, or web, is threaded from the roll through the primary unwind station and into the primer section 30.

Figure 6:
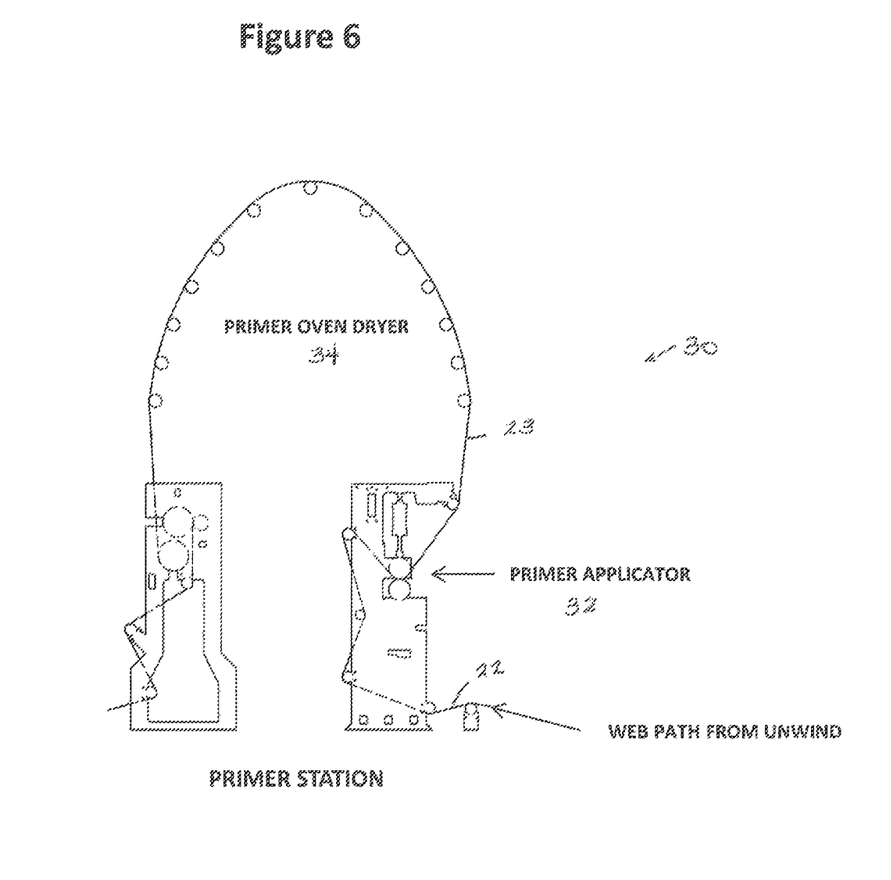
FIG. 6 is an expanded view of the primer station of the tandem process shown in FIG. 4.

Referring to FIGS. 4 and 6, in the primer station 30, a primer coating is applied by the primer applicator 32 to the web and then dried onto the web in a primer oven dryer 34. The primer is typically a polyolefin, and more specifically a polyethylene imine, and the primer coating is normally applied to the ink surface to promote bonding to the extrudate. The primer-coated web 23 then exits the primer station and is fed to the extrusion laminator section 40.

Figure 7:
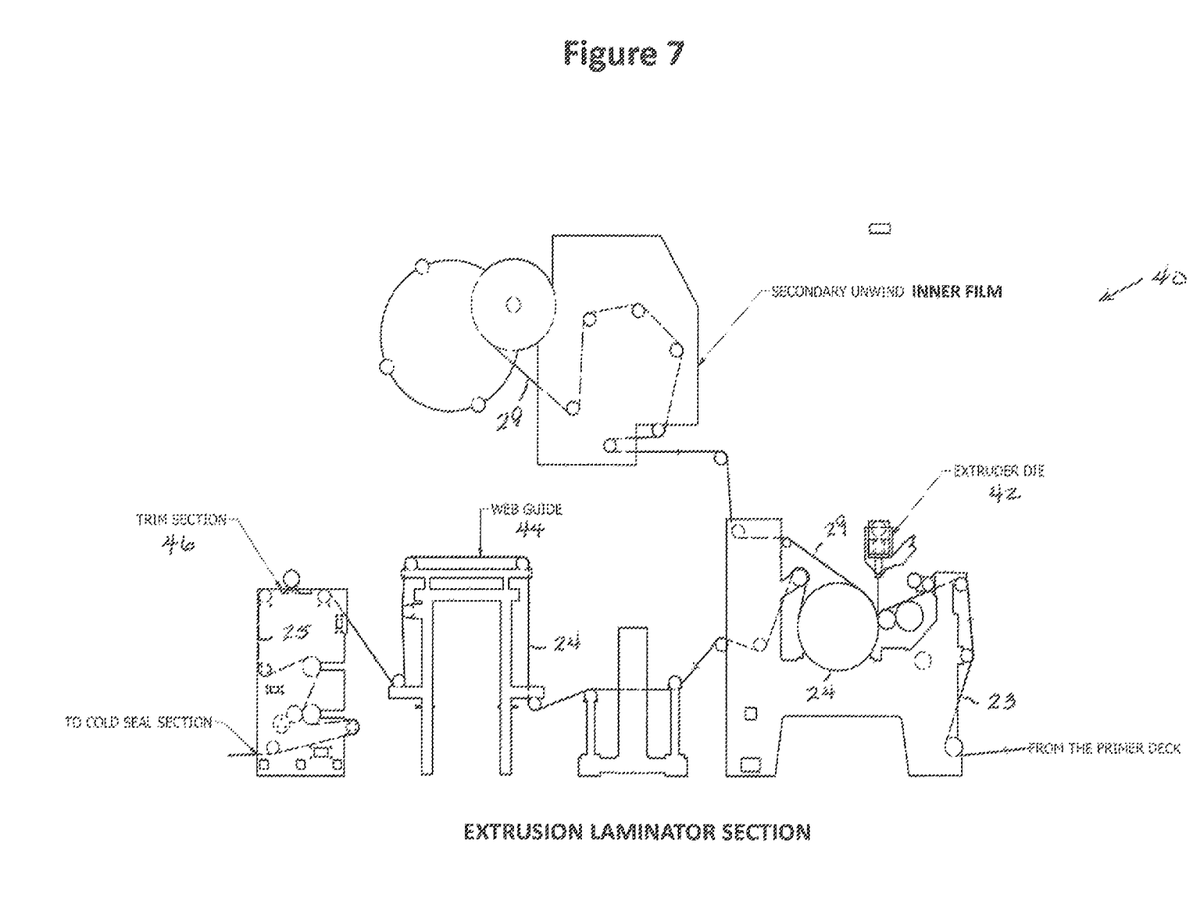
FIG. 7 is an expanded view of the extrusion laminator section of the tandem process shown in FIG. 4.
Figure 8:
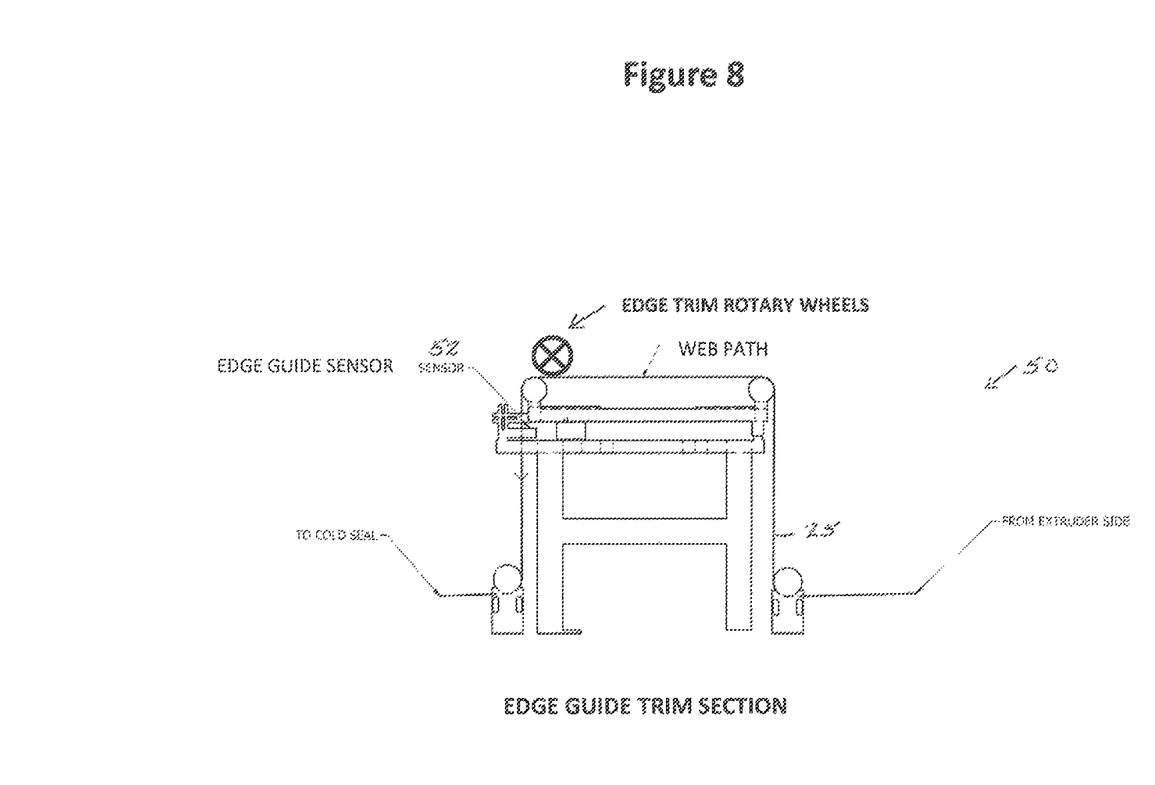
FIG. 8 is an expanded view of the edge guide trim section of the tandem process shown in FIG. 4.

As shown in FIGS. 4 and 7, in the extrusion laminator section 40, the primer-coated web 23 is bonded to an inner film 29 using an extrudate deposited by an extruder die 42. The extrudate may be any extruder resin known in the art to laminate the primer-coated web 23 to the inner film 29. The extrudate-bonded films 24, or laminate, is then fed to a web guide control 44 where one edge of the laminate is aligned. The laminate then passes into an edge trim section 46 which is linked to the web guide control (not shown). The trimmed web 25 continues into the edge guide trim section 50, as shown in FIGS. 4 and 8, where a second edge guide control sensor 52 detects the alignment of the web.

Figure 9:
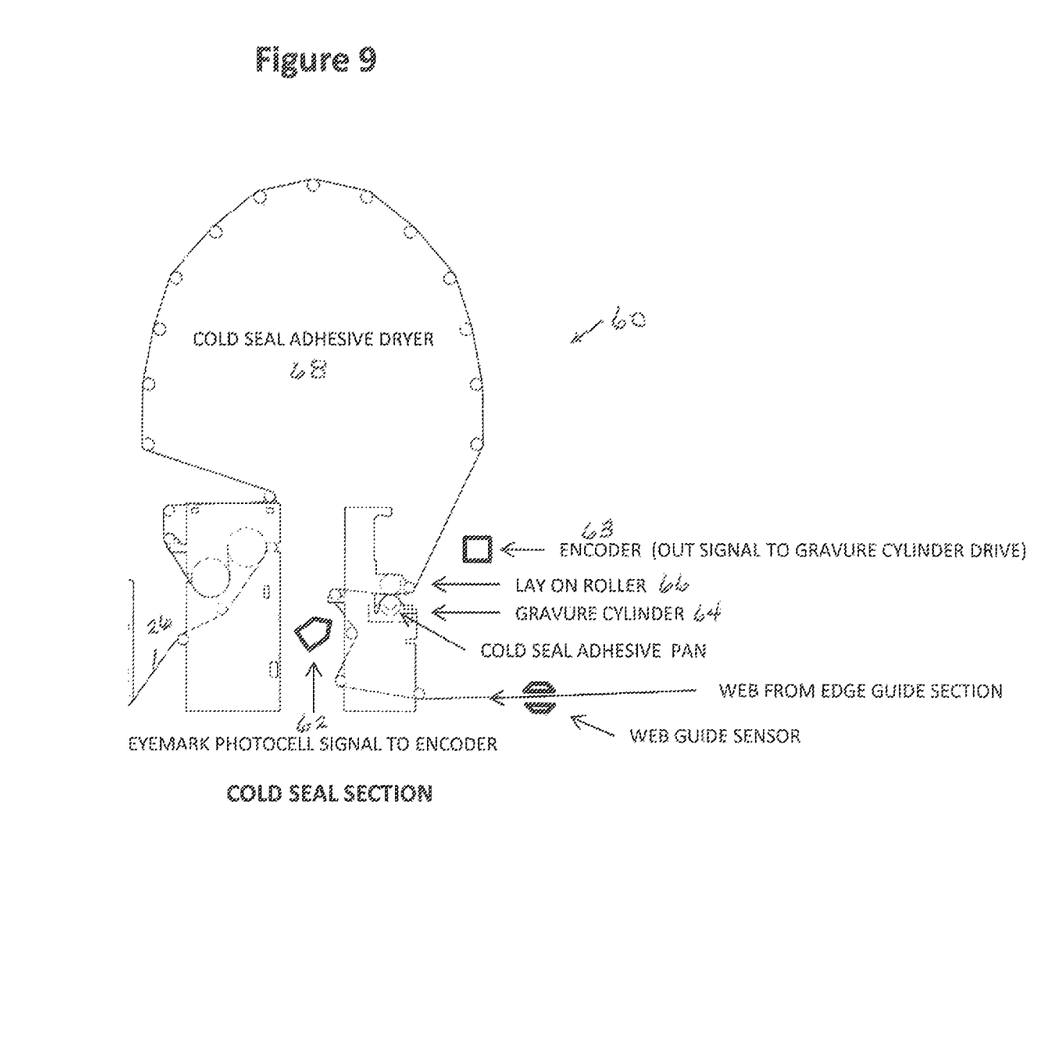
FIG. 9 is an expanded view of the cold seal section of the tandem process shown in FIG. 4.

Referring to FIGS. 4 and 9, the web 25 is then fed into the cold seal section 60. The web 25 passes by an eyemark photocell 62 which sends a signal to an encoder which then sends a signal to a gravure cylinder drive (not shown). The web then slides over a gravure cylinder 64. A lay on roller 66, preferably comprising a soft crowned rubber or neoprene or polychloroprene roller with a durometer hardness of 45, flattens the laminate web and allows the laminate web to slide over the gravure cylinder 64. As the web is slides over the gravure cylinder, a cold seal adhesive is applied to the web in a predetermined pattern. The cold seal adhesive treated web 26 then passes through a cold seal adhesive dryer 68 before exiting the cold seal section 60.

In a preferred embodiment, the edge of a first lane of etched patterns on the cold seal coating gravure roller is etched with the desired pattern of width and cut-off across the face and circumference of the cylinder. To ensure proper registration, the gravure cylinder diameter and circumference is matched to the desired graphic images. The cylinder diameter is purposely oversized by about 2% to provide compensation when applying the cold seal adhesive in register. The drive of the gravure cylinder can speed up the cylinder or slow down the cylinder to maintain the registration with the laminate web. The laminate web tension should also be maintained and controlled to insure the proper sliding action of the laminate across the gravure cylinder and accurate deposit of the adhesive.

The photocell 62 reads the eyespot mark of each printed image. A strobe light matching the web speed may be used to brighten the printed graphics and images. The photocell 62 reads the number of impressions running in the machine direction and this signal is sent to an encoder 63. The encoder 63 also receives the signal of the cylinder speed. The drive motor of the gravure roller sends a signal of the revolutions per minute based on the number of cut-off repeats around the cylinder to the encoder. The encoder matches both signals of the laminating web speed and etched gravure cylinder speed. The encoder then controls the drive motor of the gravure cylinder at a speed of from about 100 percent to about 105 percent. This compensation factor is critical to maintaining the registration.

Figure 10:
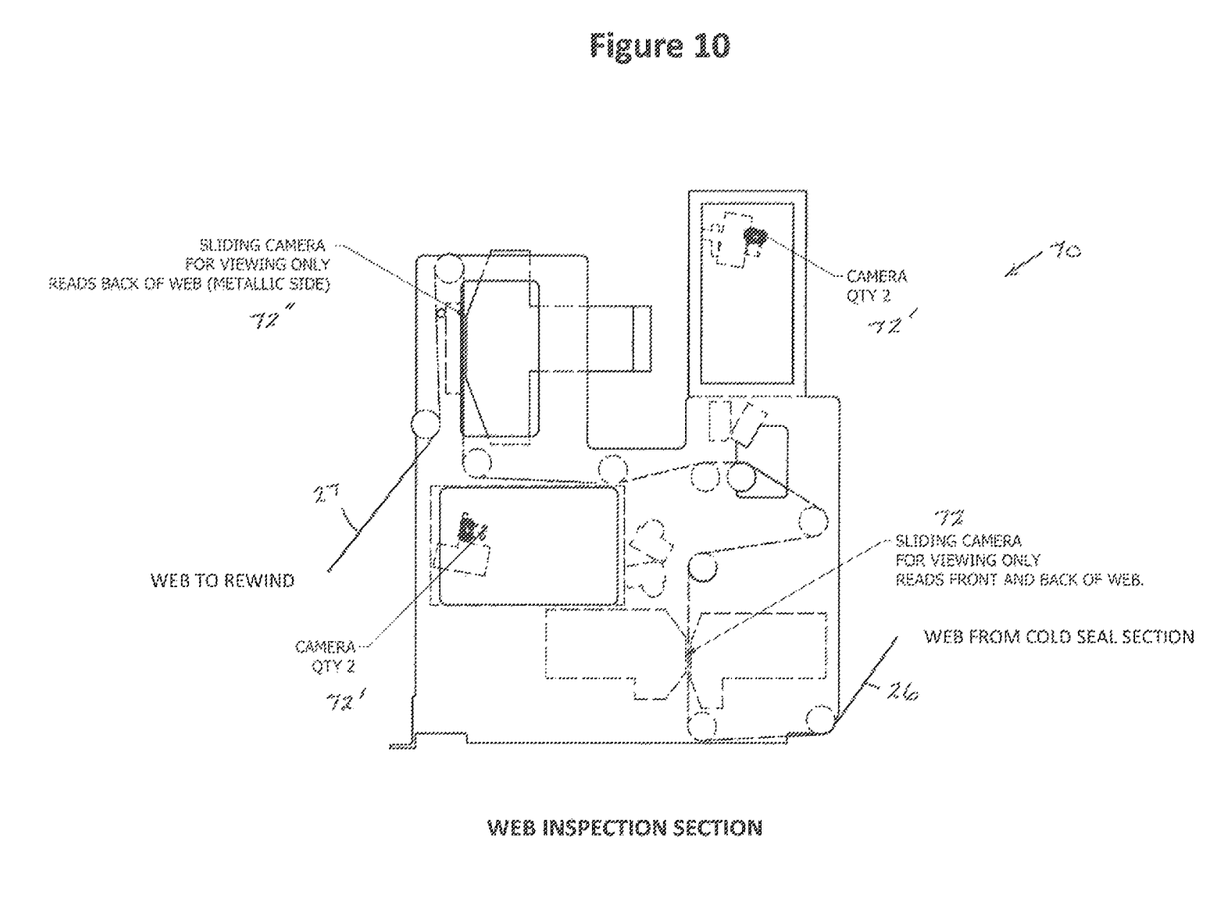
FIG. 10 is an expanded view of the web inspection section of the tandem process shown in FIG. 4.
Figure 11:
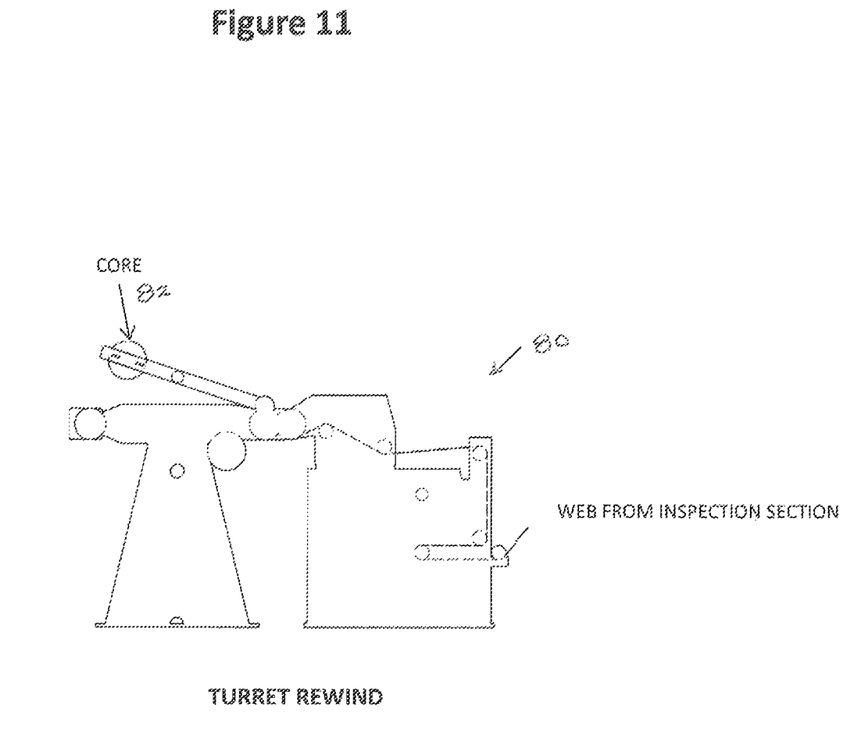
FIG. 11 is an expanded view of the turret rewind of the tandem process shown in FIG. 4.

As shown in FIGS. 4, 10 and 11, the cold-seal adhesive coated laminate 26 exits the cold seal section and enters the web inspection station 70 where a camera system 72 is used to monitor the registration of the print image and the applied cold seal adhesive. The registration is typically maintained at plus or minus 3 mm. If this variation is exceeded then the print and cold seal are out of registration. The completed flexible packaging material 27 is then fed into a turret rewind 80 where it is fed and wound onto a core 82.

As compared to the prior art, the method of the present development allows for faster recovery if the registration is lost. The web can go out of registration for a number of reasons, such as a web splice, printed eyemark image defect, poor web profile or gauge variation across the web from the lamination process, low coat weight of or no cold seal adhesive. When using a prior art extrusion lamination process, it typically requires some time to get the web back into registration, often up to ten minutes. Using the method of the present development, the recovery time is generally less than a minute, and more typically about 30 seconds. The faster recovery time also means less out of specification material and less waste are generated.

In an exemplary embodiment, not intended to be limiting with respect to scope of the development, a laminate for use as a flexible packaging wrapper for confections and other food bars is produced having an outer clear film comprising a reverse printed oriented polyolefin which is laminated to an inner film comprising an oriented polyolefin. A tandem extrusion lamination with registered cold seal process using a molten, polyolefin extrudate is used to bond the outer printed film to the inner film. A pattern of cold seal adhesive is then applied to the inner film surface. The flexible package made with the extrusion lamination process offers improved stiffness, puncture resistance, abrasion resistance and durability over a similar structure produced with adhesive lamination.

In a second embodiment, a flexible packaging wrapper is produced as in the first embodiment, except the wrapper has a metallized coating of aluminum buried against the extrudate.

The tandem extrusion lamination with registered cold seal process is most efficient using the following settings. For the tandem extrusion lamination process stage:
 a) Extruder Resin—low density polyethylene (LDPE) with a melt flow index of from about 7 to about 16, and preferably of about 8;
 b) Extruder Melt Temperature of from about 600° F. to about 645° F., preferably at about 615° F., with LDPE;
 c) Extruder Back Pressure of from about 1000 psi to about 3500 psi, preferably at about 2500 psi;
 d) Extruder Drive Motor Current of less than about 100 amps, preferably at about 70 amps;
 e) Primary Unwind Tension of about 0.75 to about 0.25 pounds per linear inch web width for the outer film;
 f) Secondary Unwind Tension of about 0.75 to about 0.25 pounds per linear inch (PLI) web width for the inner film;
 g) Laminator Tension of 0.75 to 0.25 PLI, and preferably from about 0.45 to about 0.30 PLI;
 h) Primer Coater Tension of 0.75 to 0.25 PLI, and preferably from about 0.45 to about 0.30 PLI;
 i) Primer Cooling Tension of 0.75 to 0.25 PLI, and preferably from about 0.45 to about 0.30 PLI;
 j) Primer Dryer Temperature of about 125° F. to about 250° F.;
 k) Cold Seal Adhesive Dryer Temperature of from about 180° F. to about 250° F.;
 l) Chilled Drum Temperature of from about 65° F. to about 85° F.;
 m Chilled Drum surface type mirror pocket;
 n) Extruder Nip Pressure of from about 20 to about 75 psi;
 o) Tension Settings post nip cooling of from about 0.25 to about 0.38 PLI;
 p) Rewinder Tension of from about 0.25 to about 0.38 PLI;
 q) Rewinder Taper Tension Profile of from about 5% to about 20%, and preferably of about 10%;
 r) Lay On Roller surface torque of from about 4% to about 12%, and preferably of about 8%; and
 s) Web speed of from about 500 to about 1200 fpm.
For the cold seal process stage:
 t) doctor blade up pressure of from about 4 to about 20 psi is used to neutralize the weight of the doctor blade unit;
 u) doctor blade down pressure of from about 5 to about 20 psi is applied independently to each side of the doctor blade to achieve a even wiping effect on the gravure cylinder; and,
 v) the gravure cylinder is engraved with 120 to 130 stylus, 110 to 125 line screen, surface roughness Rz of 10-20 in non-engraved areas and compressed cell 30 degrees to 40 degrees with sufficient cell depth to transfer the desired cold seal adhesive coating weight of from about 2.0 to about 4.0 pounds/ream, and up to 6.0 pounds/ream depending on the desired coat weight of the adhesive.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a layer" includes a plurality of such layers, and so forth.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise; except that compositional percentages for the ethylene content of EVOH herein are given on a mole % basis.

It is understood that, in light of a reading of the foregoing description and drawings, those with ordinary skill in the art will be able to make changes and modifications to the present invention without departing from the spirit or scope of the invention, as defined herein. For example, those skilled in the art may accomplish the extrusion lamination process by using a different resin, and/or by adjusting the temperatures and/or tensions to better suit the resin selected.

What is claimed is:

1. A tandem extrusion lamination with registered cold seal process comprising the steps of:
   a) providing a web on a primary unwind;
   b) transferring said web into a primer section wherein primer is applied to the web and then dried onto the web in a primer oven dryer;
   c) transferring the primer-coated web to an extrusion laminator section wherein said primer-coated web is bonded to an inner film using an extrudate to form a laminate;
   d) transferring said laminate to a web guide control where one edge of said laminate is aligned;
   e) using an edge trim section which is linked to the web guide control to further align said laminate;
   f) using an edge guide control sensor to detect the alignment of said laminate before said laminate enters a cold seal section;
   g) using a photocell as said laminate enters said cold seal section to send a signal to a gravure cylinder drive to confirm registration and to send a signal to an encoder specifying the laminating web speed;
   h) using a feedback system to send a signal to the encoder from the drive motor of the gravure cylinder indicating the revolutions per minute based on the number of cut-off repeats around the cylinder to the encoder;
   i) using the encoder to match the photocell signal and the feedback system signal to control a drive motor of the gravure cylinder at a speed of from about 100 percent to about 105 percent;
   j) applying cold seal adhesive to said laminate in a predetermined pattern by allowing said laminate to slide over a gravure cylinder and under a lay on roller;
   k) drying said cold seal adhesive in a cold seal adhesive dryer to produce a flexible packaging material;
   l) checking the quality of said flexible packaging material using a camera system to monitor the registration of the print image and the applied cold seal adhesive; and,
   m) transferring said flexible packaging material into a turret rewind where it is fed and wound onto a core.

2. The process of claim 1 wherein said web is further printed with graphics on at least one face.

3. The process of claim 1 wherein said lay on roller comprises a soft crowned rubber or neoprene or polychloroprene roller with a durometer hardness of 45.

4. The process of claim 1 wherein said gravure cylinder has a diameter and a circumference matched to the desired graphic images.

5. The process of claim 4 wherein said gravure cylinder has a diameter and a circumference which is purposely oversized by about 2%.

6. The process of claim 1 wherein said gravure cylinder has a variable drive so that it is possible to speed up the cylinder or slow down the cylinder to maintain the registration with the laminate web.

7. The process of claim 1 wherein said gravure cylinder is engraved with 120 to 130 stylus, 110 to 125 line screen, surface roughness Rz of 10-20 in non-engraved areas and compressed cell 30 degrees to 40 degrees with sufficient cell depth to transfer the desired cold seal adhesive coating weight of from about 2.0 to about 4.0 pounds/ream.

8. The process of claim 1 wherein said photocell reads an eyespot mark of each printed image.

9. The process of claim 1 wherein said flexible packaging material registration is maintained at a predetermined value plus or minus 3 mm.

10. The process of claim 1 wherein said primer dryer temperature is set between about 125° F. and about 250° F.

11. The process of claim 1 wherein said cold seal adhesive dryer temperature is set between about 180° F. and about 250° F.

12. The process of claim 1 wherein said extrudate is an extruder resin selected from low density polyethylenes having a melt flow index of from about 7 to about 16.

* * * * *